(12) United States Patent
Noguchi et al.

(10) Patent No.: US 11,874,634 B2
(45) Date of Patent: Jan. 16, 2024

(54) MULTI-DEVICE COORDINATION CONTROL DEVICE, MULTI-DEVICE COORDINATON CONTROL METHOD, AND MULTI-DEVICE COORDINATION CONTROL PROGRAM, AND LEARNING DEVICE, LEARNING METHOD, AND LEARNING PROGRAM

(71) Applicant: Nippon Telegraph and Telephone Corporation, Tokyo (JP)

(72) Inventors: Hirofumi Noguchi, Tokyo (JP); Yoji Yamato, Tokyo (JP); Misao Kataoka, Tokyo (JP); Takuma Isoda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 293 days.

(21) Appl. No.: 17/312,450

(22) PCT Filed: May 20, 2019

(86) PCT No.: PCT/JP2019/019959
§ 371 (c)(1),
(2) Date: Jun. 10, 2021

(87) PCT Pub. No.: WO2020/121551
PCT Pub. Date: Jun. 18, 2020

(65) Prior Publication Data
US 2022/0050426 A1    Feb. 17, 2022

(30) Foreign Application Priority Data
Dec. 12, 2018 (JP) .................. 2018-232152

(51) Int. Cl.
*G05B 13/02*    (2006.01)

(52) U.S. Cl.
CPC ................. *G05B 13/027* (2013.01)

(58) Field of Classification Search
CPC ................. G05B 13/027
(Continued)

(56) References Cited

U.S. PATENT DOCUMENTS

| 6,549,815 | B1 | 4/2003 | Kaji | |
| 7,620,613 | B1* | 11/2009 | Moore | H05K 7/20836 |
| | | | | 706/14 |

(Continued)

FOREIGN PATENT DOCUMENTS

| CN | 105717960 | 6/2016 |
| JP | H05-015598 | 1/1993 |

(Continued)

OTHER PUBLICATIONS

Matsumoto et al., "Cloud-based integrated development environment for creating human-machine interaction services," NTT Service Evolution Laboratories, The 30th Annual Conference of the Japanese Society for Artificial Intelligence, 2016, 6 pages (with English Translation).

*Primary Examiner* — Md Azad
(74) *Attorney, Agent, or Firm* — Fish & Richardson P.C.

(57) ABSTRACT

A multi device coordination control device includes: a degree-of-service-achievement calculator configured to acquire sensor information from one or more sensor devices disposed on the same physical space, and convert the acquired sensor information to a degree of service achievement; a target control amount calculation part configured to make a learning device allow an input of the degree of service achievement and compute therefrom an actuator control amount for each of the actuator devices, to thereby obtain the actuator control amount as an output value; and an actuator controller configured to convert the actuator control amount obtained as the output value to a control instruction in accordance with each of the actuator devices, and transmit (Continued)

the control instruction to each of the actuator devices, to thereby make the each of the actuator devices execute the control instruction.

5 Claims, 6 Drawing Sheets

(58) Field of Classification Search
USPC .......................................................... 700/28
See application file for complete search history.

(56) References Cited

U.S. PATENT DOCUMENTS

| | | | |
|---|---|---|---|
| 2012/0101648 A1 | 4/2012 | Federspiel et al. | |
| 2018/0181089 A1* | 6/2018 | Fuji ...................... | G05B 13/042 |
| 2019/0339687 A1* | 11/2019 | Cella ...................... | G06N 3/045 |
| 2019/0377982 A1* | 12/2019 | Ando .................. | G06F 18/2148 |
| 2020/0158369 A1* | 5/2020 | Gervais .................... | F24F 11/62 |
| 2021/0403041 A1* | 12/2021 | Jäntsch ................... | H02J 3/381 |
| 2022/0105632 A1* | 4/2022 | Oyama .................... | B25J 9/163 |
| 2023/0024518 A1* | 1/2023 | Clymer .................. | F24F 11/523 |

FOREIGN PATENT DOCUMENTS

| | | |
|---|---|---|
| JP | 2000-250603 | 9/2000 |
| JP | 2013-543569 | 12/2013 |
| WO | WO 2016/203757 | 12/2016 |

\* cited by examiner

G: Degree of difference
Ref: Target degree of service achievement
Cur: Current degree of service achievement
x: Actuator control amount
i: Actuator No.
N: Normal random number
$\sigma$ : Variance

MULTI-DEVICE COORDINATION CONTROL DEVICE, MULTI-DEVICE COORDINATON CONTROL METHOD, AND MULTI-DEVICE COORDINATION CONTROL PROGRAM, AND LEARNING DEVICE, LEARNING METHOD, AND LEARNING PROGRAM

CROSS-REFERENCE TO RELATED APPLICATIONS

This application is a National Stage application under 35 U.S.C. § 371 of International Application No. PCT/JP2019/019959, having an International Filing Date of May 20, 2019, which claims priority to Japanese Application Serial No. 2018-232152, filed on Dec. 12, 2018. The disclosure of the prior application is considered part of the disclosure of this application, and is incorporated in its entirety into this application.

TECHNICAL FIELD

The present invention relates to a multi device coordination control device, a multi device coordination control method, a multi device coordination control program, a learning device, a learning method, and a learning program, each of which controls a plurality of devices connected to a network in a coordinated manner.

BACKGROUND ART

There has been a rapid development of the IoT (Internet of Things) recently and an enormous number and variety of devices are connected to networks. Some 50 billion units of devices are estimated to be connected to the Internet in 2020. It is expected that such devices are increasingly disposed in a variety of environments such as a house, a factory, and a street, and that a multiple of IoT services appear using those devices. The IoT service is achieved by operating a wide variety of devices including a sensor such as a camera and a thermometer and an actuator such as a speaker, a light (an illuminating device), and a display, in accordance with a service environment in a coordinated manner. When a service provider provides a high-quality inexpensive IoT service, there is a need for quickly and easily constructing a complicated system with a plurality of devices coordinated therein.

A technique called R-env (registered trademark) is known as an existing technique in which a plurality of devices present in a real space are coordinated with each other (see Non-Patent Document 1). Non-Patent Document 1 discloses a technique of providing a function of absorbing an interface difference between devices and a design GUI (Graphical User Interface) tool of a coordination scenario and thereby reduces a workload of a system developer.

Related Art Document

Non-Patent Document

Non-Patent Document 1: Matsumoto, T., and 5 others, Cloud-based integrated development environment for creating human-machine interaction services, Proceedings of the 30th Annual Conference of the Japanese Society for Artificial Intelligence, 2016, 1I4-NFC-02b-1 (2016-6).

SUMMARY OF THE INVENTION

Problems to be Solved by the Invention

Regarding a logic of controlling each of devices accompanying coordinated operations of the devices (a control logic), however, even when the technique disclosed in Non-Patent Document 1 is used, manual designing or a preliminary adjustment is still required. The control logic means a rule (processing details) for controlling a more specific output value or condition in accordance with a device disposed in an environment (such as, for example, an illuminating device and an air conditioner).

A load is heavy if such an output value for each device is manually designed and adjusted in an IoT service using a plurality of devices disposed in a physical space. This is because the devices have respective different controllable areas or effects, depending on where the devices are installed, and thus have respective different optimum control amounts in accordance with their respective environments in which the devices are actually installed.

Disturbance (an external action to disturb controlling) of various types present in a living environment also makes a preliminary adjustment difficult. For example, it may be too dark to acquire a video, or noise may prevent a sound from a speaker from being appropriately transmitted to a target of interest. It takes a large amount of man-hours to create an optimum control logic for each device, after examining all possible situations.

In constructing an IoT service using the technique disclosed in Non-Patent Document 1, it is necessary to design and establish an entire system including a control logic in which a plurality of devices are coordinated with each other, while actually viewing and confirming where the devices are installed. Thus, in order to promptly provide an IoT service at low cost, there is a need for eliminating labors as described above.

In light of the problems described above, the present invention has been made in an attempt to control devices of wide variety disposed in a physical space automatically and appropriately, depending on a purpose of a service and a real-time situation.

Means for Solving the Problems

In order to solve the problems described above, according to a first aspect of the present invention, a multi device coordination control device that controls a plurality of actuator devices disposed in the same physical space, the multi device coordination control device, includes: a degree-of-service-achievement calculator configured to acquire prescribed information on the physical space as sensor information from one or more sensor devices disposed on the same physical space, and convert a value indicated by the acquired sensor information, to a degree of service achievement, the degree of service achievement being an indicator showing to what degree a purpose of a prescribed service realized by controlling the actuator device is achieved; a target control amount calculation part comprising a learning device in which machine learning is performed such that, upon an input of the degree of service achievement, an actuator control amount for each of the actuator devices, designed to satisfy a targeted degree of service achievement which is a target of a degree of service achievement for each service, is computed and outputted, the target control amount calculation part configured to make the learning device allow an input of the degree of service achievement obtained by the conversion as an input value, and make the learning device compute therefrom an actuator control amount for each of the actuator devices, to thereby obtain the actuator control amount for each of the actuator devices as an output value; and an actuator controller configured to convert the actuator control amount obtained as the output value to a control instruction in accordance with each of the actuator devices, and transmit the obtained control instruction to each of the actuator devices, to thereby make the each of the actuator devices execute the control instruction.

According to a fourth aspect of the present invention, a multi device coordination control method performed by a multi device coordination control device that controls a plurality of actuator devices disposed in the same physical space includes the steps of: acquiring prescribed information on the physical space as sensor information from one or more sensor devices disposed on the same physical space, and converting a value indicated by the acquired sensor information, to a degree of service achievement, the degree of service achievement being an indicator showing to what degree a purpose of a prescribed service realized by controlling the actuator device is achieved; making a learning device allow an input of the degree of service achievement obtained by the conversion as an input value and making the learning device compute therefrom an actuator control amount for each of the actuator devices, to thereby obtain the actuator control amount for each of the actuator devices as an output value, the learning device being subjected to machine learning such that, upon an input of the degree of service achievement, an actuator control amount for each of the actuator devices, designed to satisfy a targeted degree of service achievement which is a target of a degree of service achievement for each service, is computed and outputted; and converting the actuator control amount obtained as the output value to a control instruction in accordance with each of the actuator devices, and transmitting the obtained control instruction to each of the actuator devices, to thereby make the each of the actuator devices execute the control instruction.

In the first and fourth aspects described above, the multi device coordination control device can: acquire the sensor information from each of the sensor devices; and calculate a degree of service achievement, based on which as an input value, the learning device can calculate an actuator control amount as an output value. The multi device coordination control device then: converts the actuator control amount obtained as the output value, to a control instruction in accordance with each of the actuator devices; and transmits the control instruction thereto, to thereby make each of the actuator devices execute the control instruction. This makes it possible for a a wide variety of actuator devices disposed in a physical space to automatically and appropriately control depending on a purpose of a service and a real-time situation.

According to a second aspect of the present invention, the multi device coordination control device according to the first aspect further includes a control amount adjustment part configured to adjust an actuator control amount for each of the actuator devices. After the actuator device executes the control instruction, the degree-of-service-achievement calculator is configured to again acquire sensor information from the one or more sensor devices, and calculate a degree of service achievement after the control of the actuator device is performed, based on a value obtained from the acquired sensor information. If the degree of service achievement after the control is smaller than the targeted degree of service achievement, the control amount adjustment part is configured to calculate an adjustment control amount of the actuator device by applying evolution strategy algorithm using a degree of difference, the degree of difference being an indicator showing to what extent the degree of service achievement obtained this time after the control, is different from the targeted degree of service achievement, then calculate an actuator control amount after an adjustment of interest is made, using the calculated adjustment control amount and an actuator adjustment reference amount, the actuator adjustment reference amount being a reference for adjusting an actuator control amount of this time, and, if the degree of service achievement after the control is larger than the degree of service achievement just before the control, update the actuator adjustment reference amount with the actuator control amount of this time. The actuator controller is configured to convert the actuator control amount after the adjustment, to a control instruction in accordance with each of the actuator devices, and transmits the control instruction thereto, to thereby make each of the actuator devices execute the control instruction.

In the second aspect described above, even when the degree of service achievement after the control is performed is smaller than the targeted degree of service achievement, the multi device coordination control device calculates an adjustment control amount by applying evolution strategy algorithm using a degree of difference between the degree of service achievement after the control and the targeted degree of service achievement and can thereby calculate an actuator control amount after an adjustment is made. Thus, even when the degree of service achievement after the control is smaller than the targeted degree of service achievement because of an environmental factor which cannot be covered by the sensor devices alone disposed in the physical space, an insufficient amount of learning data, or the like, the multi device coordination control device can appropriately adjust the actuator control amount.

According to a third aspect of the present invention, in the multi device coordination control device according to the second aspect, if the degree of service achievement after the control is larger than the targeted degree of service achievement, the control amount adjustment part is configured to calculate a cost as a prescribed indicator concerning control of a plurality of the actuator devices after the control, calculate an adjustment control amount of the actuator device by applying evolution strategy algorithm using a degree of difference, the degree of difference being an indicator showing to what extent the degree of service achievement obtained this time after the control, is different from the targeted degree of service achievement, then calculate an actuator control amount after an adjustment of interest is made, using the calculated adjustment control amount and an actuator adjustment reference amount, the actuator adjustment reference amount being a reference for adjusting an actuator control amount of this time, and, if the cost after the control is smaller than the cost just before the control, update the actuator adjustment reference amount with the actuator control amount of this time The actuator controller is configured to convert the actuator control amount after the adjustment, to a control instruction in accordance with each of the actuator devices, and transmits the control instruction thereto, to thereby make each of the actuator devices execute the control instruction.

In the third aspect described above, when the degree of service achievement after the control is larger than the targeted degree of service achievement, the multi device coordination control device can adjust the actuator control amount such that a cost of controlling the actuator devices is reduced.

According to a fifth aspect of the present invention, a multi device coordination control program causes a computer to serve as the multi device coordination control device according to any one of the first to third aspects.

In the fifth aspect described above, a generally-available computer can be used for achieving functions of the multi device coordination control device according to any one of the first to third aspects.

According to a sixth aspect of the present invention, a learning device is configured to acquire: information obtained by calculating sensor information acquired from one or more sensor devices disposed on the same physical space, as a degree of service achievement which is an indicator showing to what degree a purpose of a prescribed service realized by controlling a plurality of actuator devices disposed on the same physical space, is achieved; and an actuator control amount of the actuator device at a time when the one or more sensor devices acquire the sensor information, each as learning data. The learning device includes a learning part configured to perform machine learning such that, upon an input of the degree of service achievement, an actuator control amount for each of the actuator devices, designed to satisfy a targeted degree of service achievement which is a target of a degree of service achievement for each service, is computed and outputted.

According to a seventh aspect of the present invention, a learning method of a learning device includes the steps of: acquiring information obtained by calculating sensor information acquired from one or more sensor devices disposed on the same physical space, as a degree of service achievement which is an indicator showing to what degree a purpose of a prescribed service realized by controlling a plurality of actuator devices disposed on the same physical space, is achieved, and, an actuator control amount of the actuator device at a time when the one or more sensor devices acquire the sensor information, each as learning data, and performing machine learning such that, upon an input of the degree of service achievement, an actuator control amount for each of the actuator devices, designed to satisfy a targeted degree of service achievement which is a target of a degree of service achievement for each service, is computed and outputted.

In the seventh aspect described above, the learning device can receive the degree of service achievement as an input value and thereby output an actuator control amount for each of the actuator device, designed to satisfy the targeted degree of service achievement. This makes it possible to appropriately control the actuator device in accordance with a target of a service of interest.

According to an eighth aspect of the present invention, a learning program causes a computer to serve as the learning device according to the sixth aspect.

In the eighth aspect described above, a generally-available computer can be used for achieving functions of the learning device according to the six aspect.

Advantageous Effects of the Invention

In the present invention, devices of wide variety disposed in a physical space can be controlled automatically and appropriately, depending on a purpose of a service and a real-time situation.

EMBODIMENTS FOR CARRYING OUT THE INVENTION

An embodiment for carrying out the present invention (which may also be referred to as "this embodiment" hereinafter) is described below.

Figure 1:
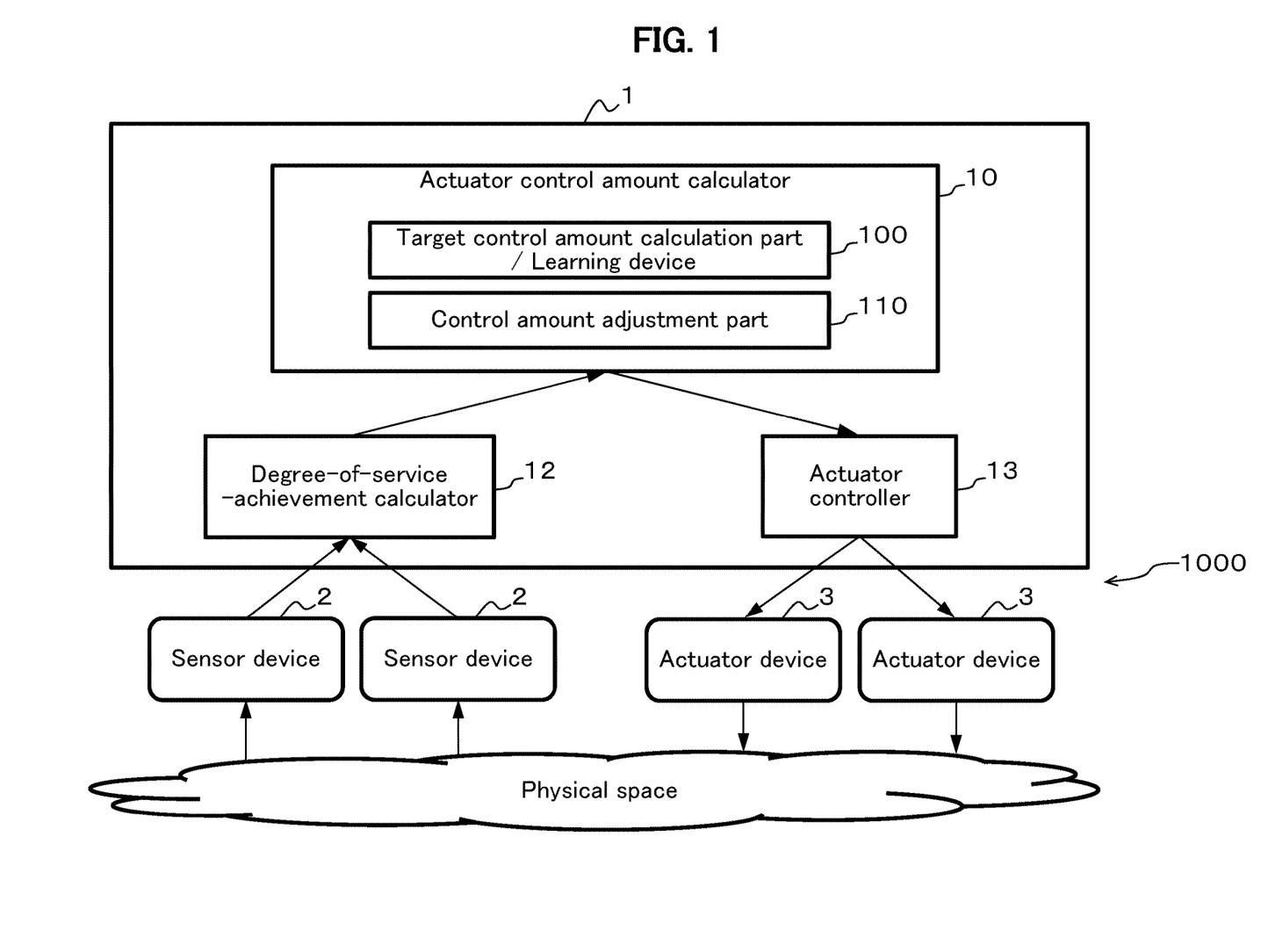
FIG. 1 is a diagram illustrating a structure of a multi device coordination control system including a multi device coordination control device according to an embodiment of the present invention.

FIG. 1 is a diagram illustrating a structure of a multi device coordination control system 1000 including a multi device coordination control device 1 according to an embodiment of the present invention.

The multi device coordination control system 1000 includes: the multi device coordination control device 1; one or more sensor devices 2 (two units of the sensor devices 2 in FIG. 1); and one or more actuator devices 3 (two units of the actuator device 3 in FIG. 1). The multi device coordination control device 1, each of the sensor devices 2, and each of the actuator devices 3 are communicably connected to each other and transmit and receive information to and from each other. All of the sensor devices 2 and the actuator devices 3 are disposed in the same physical space (for example, in the same room, facility, area (such as a park), or the like).

The multi device coordination control device 1: acquires physical space information (which may also be referred to as sensor information) from each of the sensor devices 2 present in the same physical space; and calculates a "degree of service achievement" which is an indicator of to what degree a purpose of a prescribed service is achieved by controlling the actuator device 3. The multi device coordination control device 1: inputs therein the degree of service achievement; outputs an amount of actuator control such that a target value of the degree of service achievement is satisfied using machine learning (algorithm); and controls the actuator device 3 based on the outputted actuator control amount. After controlling the actuator device 3 at the calculated actuator control amount, the multi device coordination control device 1: calculates a degree of service achievement after the control is performed; calculates a degree of difference between the degree after the control and a targeted degree of service achievement (a degree of service achievement as a target for each service); and adjusts the actuator control amount, to thereby realize a more appropriate control of the actuator device 3. Details will be described hereinafter.

Multi Device Coordination Control Device

Next is described more specifically the multi device coordination control device 1 according to this embodiment.

The multi device coordination control device 1 is realized by a computer including a controller, an input/output part, and a storage (all of which are not illustrated).

The input/output part includes: a communication interface for transmitting and receiving information; and an input/output interface which transmits and receives information between an input device such as a touch panel and a keyboard and an output device such as a monitor.

Figure 3:
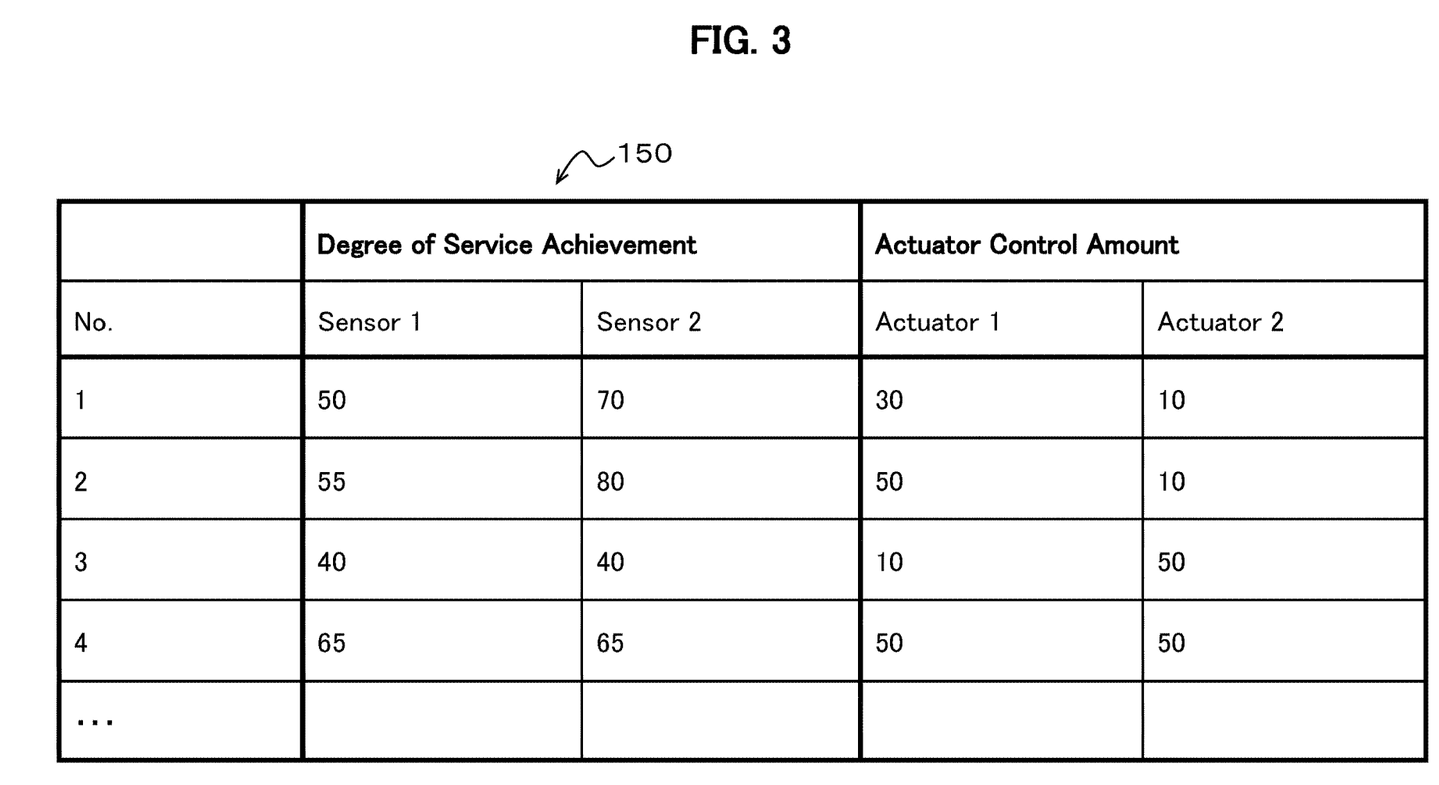
FIG. 3 is a diagram illustrating an example of a data structure of information on correspondence between degree of service achievement and actuator control amount according to the embodiment.

The storage includes a flash memory, a hard disk, a RAM (Random Access Memory), or the like. The storage of the multi device coordination control device 1 stores therein, as illustrated in FIG. 3 to be described later, information on correspondence between degree of service achievement and actuator control amount 150 and a degree of service achievement as a target for each service (a targeted degree of service achievement).

The controller includes, as illustrated in FIG. 1, an actuator control amount calculator 10, a degree-of-service-achievement calculator 12, and an actuator controller 13.

The degree-of-service-achievement calculator 12: acquires sensor information as prescribed information on a physical space (physical space information) from each of the sensor devices 2; and converts a value indicated by the sensor information to a "degree of service achievement" which is a quantitative value (an indicator) showing to what degree a purpose of a service is achieved. In the multi device coordination control device 1 according to this embodiment, a service of interest is set such that the service achieves a purpose of some kind. The actuator device 3 is thus controlled such that a given purpose of a service is achieved, for example, viewing of a monitoring video at a store (face recognition (identification)) and provision of a comfortable environment to a customer. In those cases, respective degrees of service achievement are, for example, clarity of the video in the former case, and a value quantifying a smiling face of the customer in the latter.

The degree-of-service-achievement calculator 12 acquires: physical space information (sensor information) from each of the sensor devices 2 disposed in the physical space on a real time basis (at intervals of prescribed time periods); and calculates a degree of service achievement as an indicator value corresponding to a purpose of a service of interest, using the sensor information. The degree of service achievement is calculated as, for example, a value in a range from 0 to 100. The degree-of-service-achievement calculator 12 previously registers therein a software (a prescribed logic) which can calculate an indicator value of a degree of service achievement corresponding to a service of interest. For example, if the sensor device 2 is a camera (an imaging device), calculation of the degree of service achievement is performed using a known technique such as a generally-available image analyzing application.

The actuator controller 13: receives an actuator control amount (which may also be referred to as a "target control amount") from the actuator control amount calculator 10 to be described later; and converts the received actuator control amount to a control instruction in accordance with each of the actuator devices 3; and thereby makes the actuator device 3 operate. It is assumed herein that each of the actuator devices 3 is in a standby state in which a control instruction from an externally provided device or the like in a network thereto can be received at any time.

Logic for converting an actuator control amount (a target control amount) to a control instruction implemented by the actuator controller 13 is not limited to a specific technique. As an example, the logic may be implemented by a technique in which: a target control amount is defined as a value in a range from 0 to 100; and, when the actuator device 3 can actually receive an output instruction at a resolution in a range from 0 to 256, the target control amount and the resolution are made to linearly correspond to each other.

The actuator control amount calculator 10: receives information on the degree of service achievement calculated based on the sensor information from each of the sensor devices 2, as an input value, from the degree-of-service-achievement calculator 12; and thereby outputs an actuator control amount (a target control amount) for controlling each of the actuator devices 3, as an output value, to the actuator controller 13.

After controlling the actuator device 3 in accordance with the calculated actuator control amount (the target control amount), the actuator control amount calculator 10: acquires a degree of service achievement after the control is performed; and adjusts an actuator control amount based on a degree of difference between the degree after the control and a targeted degree of service achievement. The actuator control amount calculator 10 outputs the actuator control amount after the adjustment, to the actuator controller 13, to thereby control the actuator device 3. Then the actuator control amount calculator 10: repeats calculation of a degree of service achievement after the control is performed; and repeats adjustment of the calculated degree of service achievement each time after the the control is performed, to thereby calculate a more appropriate actuator control amount. Details will be described hereinafter with reference to FIG. 6.

The actuator control amount calculator 10 includes a target control amount calculation part 100 (which may also be referred to as a learning device) and a control amount adjustment part 110.

The target control amount calculation part 100 holds therein a degree of service achievement as a target for each service (a targeted degree of service achievement). The target control amount calculation part 100 serves as a learning device in which a machine learning model is constructed, taking a degree of service achievement as an input value and an actuator control amount (a target control amount) as an output value.

Figure 2:
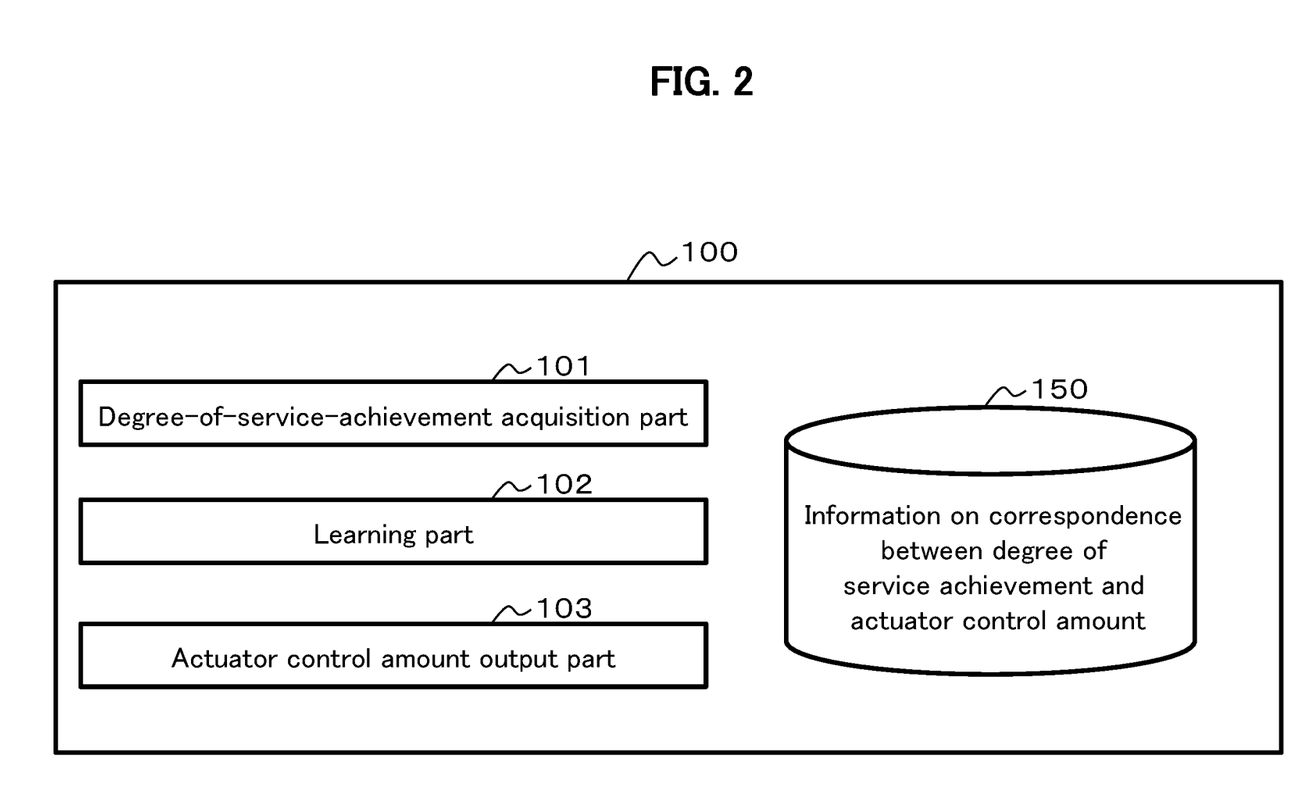
FIG. 2 is a functional block diagram illustrating a target control amount calculation part as a learning device according to the embodiment.

FIG. 2 is a functional block diagram illustrating the target control amount calculation part 100 as a learning device according to this embodiment.

The target control amount calculation part 100 (learning device) includes a degree-of-service-achievement acquisition part 101, a learning part 102, an actuator control amount output part 103, and the information on correspondence between degree of service achievement and actuator control amount 150 (see FIG. 3).

The degree-of-service-achievement acquisition part 101: acquires information on a degree of service achievement from the degree-of-service-achievement calculator 12 (FIG. 1); creates a new record corresponding thereto in the information on correspondence between degree of service achievement and actuator control amount 150 (FIG. 3); and makes the record store therein.

The actuator control amount output part 103 stores the actuator control amount (target control amount) calculated by the learning part 102 by taking the degree of service achievement as an input value, in the information on correspondence between degree of service achievement and actuator control amount 150, as an output value corresponding to the input value (an actuator control amount). The actuator control amount output part 103 outputs the actuator control amount (target control amount) to the actuator controller 13 (FIG. 1).

FIG. 3 is a diagram illustrating an example of a data structure of the information on correspondence between degree of service achievement and actuator control amount 150 according to this embodiment.

As illustrated in FIG. 3, the information on correspondence between degree of service achievement and actuator control amount 150 stores therein information on a degree of service achievement calculated by the degree-of-service-achievement calculator 12, for each of the sensor devices 2 ("Sensor 1" and "Sensor 2" in FIG. 3). In the example of FIG. 3, a record No. 1 contains: "50" as a degree of service achievement of Sensor 1; and "70" as a degree of service achievement of Sensor 2. The information on correspondence 150 also stores therein, for each of the actuator devices 3 ("Actuator 1" and "Actuator 2" in FIG. 3), an actuator control amount (a target control amount) which is a result outputted by the learning part 102 by taking the degree of service achievement as an input value. In the example of FIG. 3, the record No. 1 contains: "30" as an actuator control amount (a target control amount) of Actuator 1; and "10" as an actuator control amount (a target control amount) of Actuator 2.

The sensor devices 2 ("Sensor 1" and "Sensor 2") and the actuator devices 3 ("Actuator 1" and "Actuator 2") in FIG. 3 are all disposed in the same physical space.

In a more specific example of the sensor devices 2, "Sensor 1" and "Sensor 2" are cameras (imaging devices). A cell of "Sensor 1" of "Degree of Service Achievement" in FIG. 3 contains, for example, a value of a degree of service achievement corresponding to clarity in viewing a monitoring video at a store, as a purpose of a service. A cell of "Sensor 2" thereof contains, for example, a value of a degree of service achievement corresponding to provision of a comfortable environment to a customer, as a purpose of a service. A device in which an actuator control amount corresponding to the degree of service achievement used is, for example: a light (an illuminating device) as "Actuator 1"; and, an air conditioner as "Actuator 2". An actuator control amount (a target control amount) outputted to each of the actuator devices 3 (herein, "Actuator 1" and "Actuator 2") is calculated as an adjusted value which takes into account each of (all) degrees of service achievement based on each of the sensor devices 2 (herein, "Sensor 1" and "Sensor 2"), using machine learning algorithm in the learning part 102.

"Sensor 1" and "Sensor 2" may be devices of respective types different from each other and may be of the same type disposed in the same physical space as described above. "Sensor 1" and "Sensor 2" may be used for the same service purpose.

Similarly, "Actuator 1" and "Actuator 2" may be the actuator devices 3 of respective types different from each other and may be the actuator device 3 of the same type as described above. When the actuator devices 3 (for example, illuminating devices) are of the same type, the actuator devices 3 are disposed at, for example, respective positions different from each other in the same physical space.

Referring back to FIG. 2, the learning part 102: takes information on a degree of service achievement in the information on correspondence between degree of service achievement and actuator control amount 150, as an input value; and outputs (calculates) an actuator control amount (a target control amount) corresponding thereto, using machine learning algorithm. At this time, the learning part 102 outputs the actuator control amount (target control amount) required for satisfying a prescribed targeted degree of service achievement for each service. The learning part 102 performs machine learning based on learning data in which: a value of a degree of service achievement in the information on correspondence between degree of service achievement and actuator control amount 150 (FIG. 3) is taken as an input value; and, a value of an actuator control amount (a target control amount), as an output value. Upon receipt of an input of a degree of service achievement, the learning part 102 serves as machine learning algorithm which outputs an actuator control amount (a target control amount) satisfying a corresponding targeted degree of service achievement.

The machine learning algorithm used by the learning part 102 is implemented by, for example, a neural network, logistic regression, or the like. The machine learning algorithm used by the learning part 102 according to this embodiment is not limited to those described above. It is assumed herein, however, that in any learning model, an output value (an actuator control amount) is returned in response to an input value (a degree of service achievement).

Note that when the information on correspondence between degree of service achievement and actuator control amount 150 (FIG. 3) stores therein a degree of service achievement as an input value and an actuator control amount (a target control amount) as an output value corresponding thereto by a processing performed by the actuator control amount calculator 10 (including an adjustment processing performed by the control amount adjustment part 110 to be described later), the learning part 102 retrieves the stored data as learning data, to thereby update the machine learning algorithm. That is, the target control amount calculation part 100 (learning device) acquires new learning data; and thereby learns such that a more appropriate output value is calculated, after each execution of a processing as described above.

Figure 4:
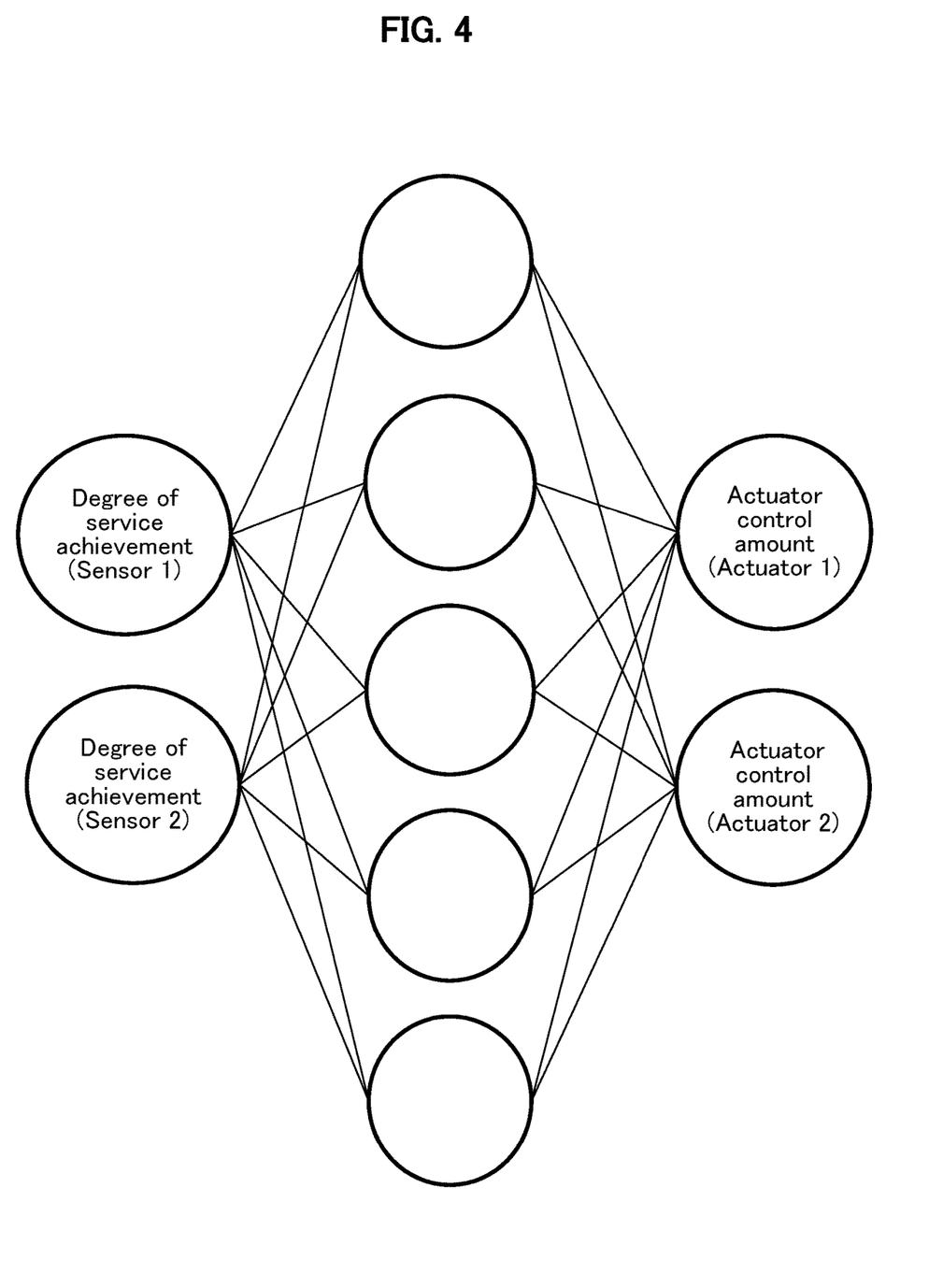
FIG. 4 is a diagram for explaining a processing performed by a learning part when a neural network is used as machine learning algorithm.

FIG. 4 is a diagram for explaining a processing performed by the learning part 102 when a neural network is used as machine learning algorithm.

As illustrated in FIG. 4, an input layer allows an input of a degree of service achievement from each of the sensor devices 2 ("Sensor 1" and "Sensor 2") in accordance with the information on correspondence between degree of service achievement and actuator control amount 150. Then, an actuator control amount (a target control amount) for each of the actuator devices 3 ("Actuator 1" and "Actuator 2"), which is made to satisfy a targeted degree of service achievement is outputted via an intermediate layer. The intermediate layer is not limited to a single layer as illustrated in FIG. 4 and may be a multi-layer in which learning is performed by means of deep learning.

Referring back to FIG. 1, the control amount adjustment part 110 is described below.

Regarding a service in a physical space with which the multi device coordination control device 1 according to this embodiment is concerned, there may be an environmental factor which cannot be covered by the sensor device 2 alone disposed in the physical space. Also, at an early stage after a service is started, an amount of information (learning data) stored in the information on correspondence between degree of service achievement and actuator control amount 150 may not yet be sufficient. In light of the above-described factors, even when each of the actuator devices 3 is operated at an actuator control amount (a target control amount) obtained by the actuator control amount calculator 10, there is a possibility that a corresponding degree of service achievement falls short of a prescribed target. Herein, the control amount adjustment part 110 adjusts an actuator control amount, if an actual degree of service achievement (which may be hereinafter referred to as a "current degree of service achievement") obtained when the actuator device 3 is operated based on an actuator control amount (a target control amount) obtained from the actuator control amount calculator 10 (the target control amount calculation part 100), is different from a corresponding targeted degree of service achievement.

Figure 5:
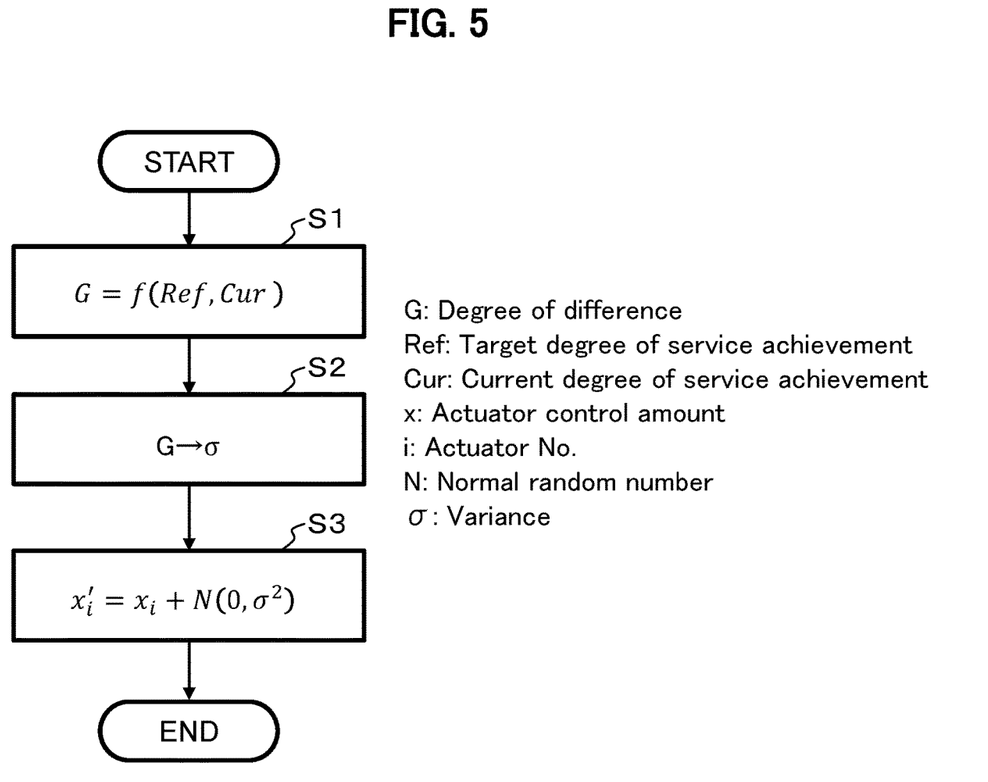
FIG. 5 is a flowchart illustrating steps of a processing of adjusting an actuator control amount performed by a control amount adjustment part according to the embodiment.

More specifically, the control amount adjustment part 110 calculates, as illustrated in steps of FIG. 5, an actuator control amount after adjustment, using evolution strategy algorithm.

FIG. 5 is a flowchart illustrating steps of a processing of adjusting an actuator control amount performed by the control amount adjustment part 110 according to this embodiment.

Description herein is made assuming the following. As a start, the target control amount calculation part 100 calculates an actuator control amount (a target control amount); each of the actuator devices 3 is controlled under a control instruction from the actuator controller 13; and each of the sensor devices 2 acquires a result of the control as sensor information. The degree-of-service-achievement calculator 12 then calculates a degree of service achievement after the control is performed (at this point in time) (a current degree of service achievement).

As illustrated in FIG. 5, the control amount adjustment part 110 calculates a degree of difference (G) between a targeted degree of service achievement (Ref) and a current degree of service achievement (Cur) (step S1). The degree of difference is an indicator showing to what extent the current degree of service achievement is different from the targeted degree of service achievement. A technique of calculating the degree of difference is not specifically limited and may include, for example: simply subtracting a current degree of service achievement from a targeted degree of service achievement; and using a ratio of a current degree of service achievement to a targeted degree of service achievement.

The control amount adjustment part 110 then takes a value of the degree of difference (G) as a variance value (σ) (step S2), to thereby create a normal random number (N). The control amount adjustment part 110: takes the created normal random number (N) as an adjustment control amount; and adds the adjustment control amount to a current actuator control amount $x_i$ (which may also be referred to as an "actuator adjustment reference amount" to be described hereinafter), to thereby obtain an actuator control amount $x_i'$ after adjustment (step S3).

In the step described above, the larger the degree of difference, the larger an increase or decrease in an amount of adjustment of the actuator control amount. This means that: when a degree of difference is small, an amount of adjustment is very small; and, when large, drastically large.

Note that when a degree of difference is large, there may be a significant shortage of an amount of information in the information on correspondence between degree of service achievement and actuator control amount 150; or there may be some change in an environment of interest. The control amount adjustment part 110 has a function as described above in which the larger the degree of difference, the larger the adjustment, which leads a subsequent action different from what it was. This can prevent learning from being trapped in a local solution and can make the learning performed in accordance with an environment of interest on a real-time basis.

The actuator control amount calculator 10 outputs the actuator control amount after adjustment calculated by the control amount adjustment part 110, to the actuator controller 13, to thereby perform control of each of the actuator devices 3. The degree-of-service-achievement calculator 12 then: acquires sensor information from the sensor device 2; and calculates again a degree of service achievement at the present moment (a current degree of service achievement). At this time, the control amount adjustment part 110 updates a current actuator control amount (an actuator adjustment reference amount) to be used in calculating a subsequent adjustment control amount is calculated, only when the calculated degree of service achievement this time is larger than a previous degree of service achievement. The actuator adjustment reference amount is a reference amount for adjusting an actuator control amount at this time. That is, when a degree of service achievement corresponding to a currently-used adjustment control amount becomes higher than the previous degree of service achievement, then the control amount adjustment part 110: determines the adjustment control amount as appropriate; and updates the "actuator adjustment reference amount" with the current actuator control amount (see step S18→Yes in FIG. 6 to be described later). When a degree of service achievement corresponding to a currently-used adjustment control amount becomes lower than the previous degree of service achievement, then the control amount adjustment part 110: determines the currently-used adjustment control amount as inappropriate; and skips an update of the actuator adjustment reference amount (see step S18→No in FIG. 6 to be described later).

In calculating an actuator control amount according to this embodiment, a cost is also taken into account. The cost herein means a prescribed indicator concerning control of the actuator device 3. One of examples of the indicator is a power consumption as a negative factor that accompanies controlling of the actuator device 3. Instead of the power consumption, another example of the indicator of the cost is a sum of control amounts of the actuator devices 3 ("Actuator Control Amount" illustrated in FIG. 3).

When a power consumption is used as a cost, the storage (not illustrated) of the multi device coordination control device 1 previously stores therein information showing a power consumption corresponding to a control amount of each of the actuator devices 3. This allows a calculation to be performed taking a power consumption corresponding to a control amount as a cost. Description below is made assuming that a sum of control amounts (actuator control amounts) of the actuator devices 3 is used as a cost.

When an actual degree of service achievement after a control is performed (a current degree of service achievement) is larger than a targeted degree of service achievement, the control amount adjustment part 110 finds such an actuator control amount that satisfies a targeted degree of service achievement with a smaller cost (an actuator control amount after adjustment is made). How to calculate an adjustment control amount is similar to that when a degree of service achievement is smaller than a targeted degree of service achievement as described above. An actuator adjustment reference amount is, however, updated only when a cost becomes lower after a control is performed (see step S19→No in FIG. 6 to be described later).

With a configuration described above, the multi device coordination control device 1 can calculate an actuator control amount having an optimized cost. In an example of an actual service, the actuator devices 3 are a plurality of lights (illuminating devices). In this case, if a part or all of the lights are designed to have the same effect such as, for example, improvement in resolution, the lights are operated with respective values (control amounts) only required for achieving the effect, thus allowing an unnecessary control (output) to be prevented.

The control amount adjustment part 110 repeatedly performs a control over each of the actuator devices 3 for adjusting an actuator control amount, to thereby provide a more appropriate control thereto. Herein, in order to prevent the control from being infinitely repeated, the control amount adjustment part 110: sets a prescribed upper limit (a prescribed value) to the number of times to adjust a control amount; and terminates an adjustment when the number reaches the upper limit. The control amount adjustment part 110 also terminates an adjustment when a degree of difference between the current degree of service achievement and the targeted degree of service achievement is equal to or smaller than a prescribed threshold.

Steps of Processing

Next are described steps of a processing performed by the multi device coordination control device 1.

Figure 6:
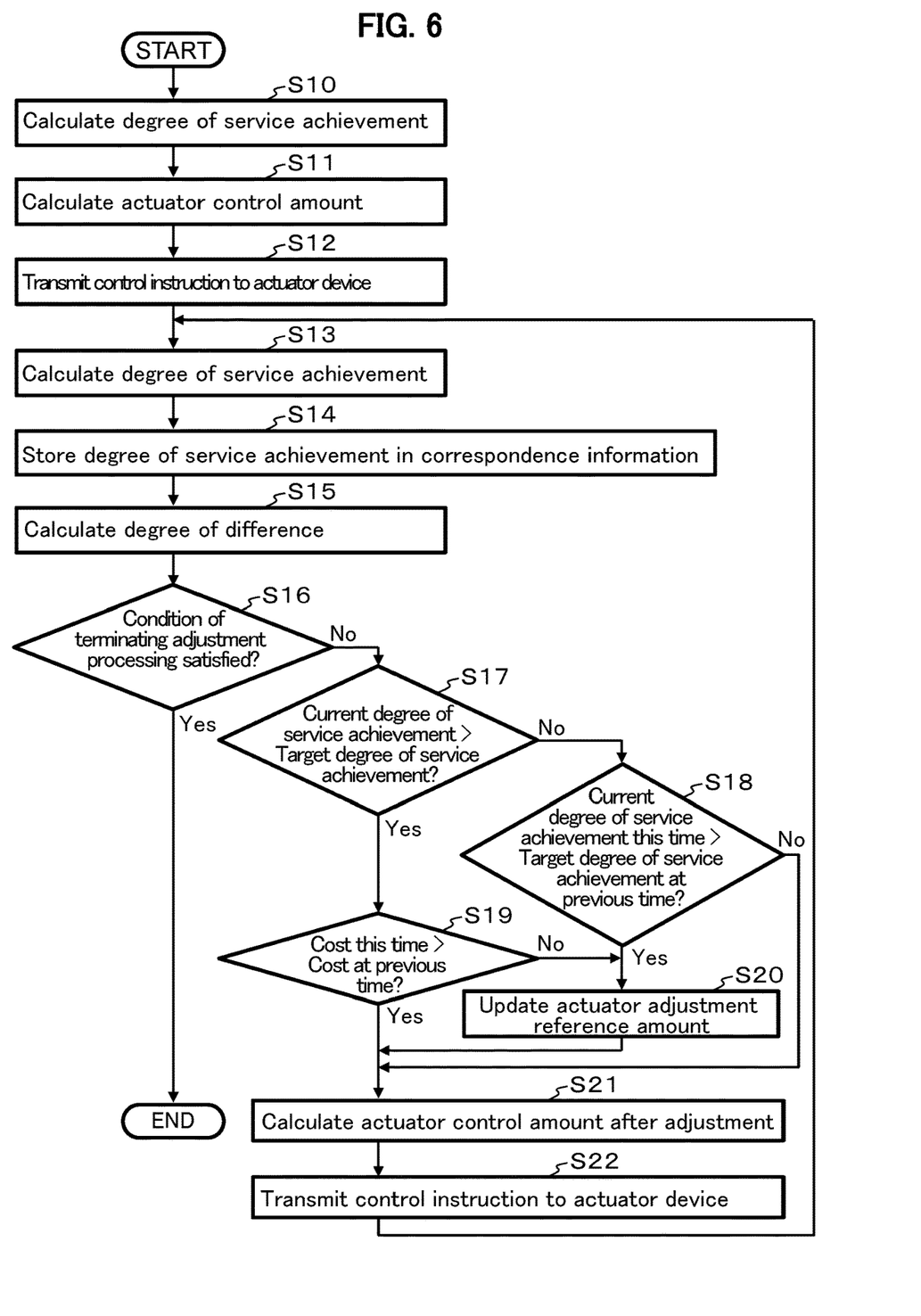
FIG. 6 is a flowchart illustrating steps of a processing performed by the multi device coordination control device 1 according to the embodiment.

FIG. 6 is a flowchart illustrating the steps of the processing performed by the multi device coordination control device 1 according to this embodiment.

The following is herein assumed. Each of the sensor devices 2 and each of the actuator devices 3 are already disposed in the same physical space. The multi device coordination control device 1 stores, in a storage (not illustrated): information on a targeted degree of service achievement which is a target value of a degree of service achievement made to correspond to each of the sensor devices 2; a prescribed threshold of a degree of difference at which adjustment is terminated; and an upper limit (a prescribed value) of the number of times to adjust a control amount.

The degree-of-service-achievement calculator 12 (FIG. 1) of the multi device coordination control device 1 acquires information on the physical space (sensor information) from each of the sensor devices 2. Note that the degree-of-service-achievement calculator 12: performs acquisition of the sensor information at intervals of prescribed time periods; and repeats subsequent steps.

The degree-of-service-achievement calculator 12 calculates a degree of service achievement (a current degree of service achievement) in accordance with a purpose of a service made to correspond to each of the sensor devices 2, based on the acquired sensor information (step S10). The degree-of-service-achievement calculator 12 outputs the calculated degree of service achievement (current degree of service achievement) to the actuator control amount calculator 10 (FIG. 1).

In the target control amount calculation part 100 (learning device) of the actuator control amount calculator 10, the degree-of-service-achievement acquisition part 101 (FIG. 2) acquires information on the degree of service achievement (the current degree of service achievement) made to correspond to each of the sensor devices 2; and the information on correspondence between degree of service achievement and actuator control amount 150 (FIG. 3) stores therein the acquired information.

The learning part 102 (FIG. 2) of the target control amount calculation part 100 (learning device) calculates an actuator control amount which can satisfy a targeted degree of service achievement (a target control amount) of interest, using machine learning algorithm (step S11).

The actuator control amount output part 103 (FIG. 2) of the target control amount calculation part 100 (learning device): stores the actuator control amount (target control amount) calculated by the learning part 102, in the information on correspondence between degree of service achievement and actuator control amount 150 (FIG. 3); and also outputs the calculated actuator control amount to the actuator controller 13 (FIG. 1).

Note that the calculated actuator control amount is stored in the storage (not illustrated) as an initial value of the current actuator control amount $x_t$ illustrated in FIG. 5 (an actuator adjustment reference amount).

Upon acquisition of the actuator control amount (the target control amount), the actuator controller 13: converts the actuator control amount to a control instruction in accordance with each of the actuator devices 3; and transmits the control instruction thereto (step S12), to thereby perform control of each of the actuator devices 3.

Subsequent steps S13 to S22 constitute a processing of adjusting an actuator control amount performed mainly by the control amount adjustment part 110.

The degree-of-service-achievement calculator 12 (FIG. 1) of the multi device coordination control device 1 acquires the physical space information (sensor information) which is a result obtained when the actuator device 3 performs a control pursuant to a control instruction, from each of the sensor devices 2. The degree-of-service-achievement calculator 12 calculates a degree of service achievement (a current degree of service achievement) in accordance with a service purpose corresponding to each of the sensor devices 2 (step S13). The degree-of-service-achievement calculator 12 outputs the calculated degree of service achievement (current degree of service achievement) to the actuator control amount calculator 10.

The control amount adjustment part 110 (FIG. 1) of the actuator control amount calculator 10: creates a new record of information on the degree of service achievement (the current degree of service achievement) corresponding to each of the sensor devices 2; and stores the record in the information on correspondence between degree of service achievement and actuator control amount 150 (FIG. 3) (step S14). Note that in FIG. 6, the information on correspondence between degree of service achievement and actuator control amount 150 is described as "correspondence information".

The control amount adjustment part 110 calculates a degree of difference using the targeted degree of service achievement and the current degree of service achievement calculated in step S13 (step S15).

The control amount adjustment part 110 calculates the degree of difference using an appropriate technique such as, for example, subtraction of a current degree of service achievement from a targeted degree of service achievement and calculation based on a ratio of a current degree of service achievement to a targeted degree of service achievement.

The control amount adjustment part 110 determines whether or not a condition of terminating the adjustment processing is satisfied. More specifically, the control amount adjustment part 110 determines whether or not either of the following is satisfied: the calculated degree of difference is equal to or smaller than a prescribed threshold; or the number of times to adjust a control amount is equal to or more than an upper limit (a prescribed value) is satisfied (step S16). Note that each time a degree of difference is calculated in step S15, the control amount adjustment part 110 increments the number of times by "+1" (with an initial value "0").

This intends to prevent the processing of adjusting an actuator control amount from being infinitely repeated.

If the degree of difference is determined to be equal to or smaller than the prescribed threshold (step S16→Yes), the control amount adjustment part 110: determines that a control of the actuator device 3 which satisfies the targeted degree of service achievement has been accomplished; and terminates the processing. Also, if the number of times to adjust a control amount is determined to reach a previously-set upper limit (step S16→Yes), the control amount adjustment part 110 terminates the processing.

If it is determined that neither the degree of difference is equal to or smaller than the prescribed threshold nor the number of times to adjust a control amount is equal to or more than the upper limit (step S16→No), the control amount adjustment part 110 advances the processing to the next step S17.

In step S17, the control amount adjustment part 110 determines whether or not the current degree of service achievement obtained this time is larger than the targeted degree of service achievement. If the current degree of service achievement is determined to be larger than the targeted degree of service achievement (step S17→Yes), the processing advances to step S19. If the current degree of service achievement is not determined to be larger than the targeted degree of service achievement (step S17→No), the processing advances to step S18.

In step S18, the control amount adjustment part 110 compares the current degree of service achievement obtained this time with a degree of service achievement obtained at a previous time (a degree of service achievement at a previous time). If the current degree of service achievement this time is determined to be larger than the degree of service achievement at the previous time (step S18→Yes), the processing advances to step S20. If the current degree of service achievement this time is not determined to be larger than the degree of service achievement at the previous time (step S18→No), the processing advances to step 21.

In step S19, the control amount adjustment part 110: calculates a cost of this time (for example, a sum of current (latest) actuator control amounts illustrated in FIG. 3); and compares the cost this time with a cost at a previous time (a cost at a previous time). If the cost of this time is determined to be larger than the cost at the previous time (step S19→Yes), the processing advances to step S21. If the cost of this time is not determined to be larger than the cost at the previous time (step S19→No), the processing advances to step 20.

In step S20, the control amount adjustment part 110 updates the actuator adjustment reference amount with the current (latest) actuator control amount. This allows the current actuator control amount $x_i$ (the actuator adjustment reference amount) illustrated in FIG. 5 to be updated with a more appropriate actuator control amount. The actuator control amount can be thus adjusted to an amount which satisfies the targeted degree of service achievement and reduces cost. After the control amount adjustment part 110 updates the actuator adjustment reference amount in step S20, the processing advances to step S21.

In step S21, the control amount adjustment part 110 calculates an adjustment control amount, using the evolution strategy algorithm illustrated in FIG. 5, to thereby obtain an actuator control amount after the adjustment is made. The control amount adjustment part 110: stores the calculated adjusted actuator control amount in the information on correspondence between degree of service achievement and actuator control amount 150 (FIG. 3); and also outputs the calculated amount to the actuator controller 13.

Upon acquisition of the adjusted actuator control amount, the actuator controller 13: converts the adjusted amount to a control instruction in accordance with each of the actuator devices 3; and outputs the control instruction to each of the actuator devices 3 (step S22). Each of the actuator devices 3 is thus controlled. The processing then returns to step S13.

As described above, In each of the multi device coordination control device 1, the multi device coordination control method, and the multi device coordination control program according to this embodiment, sensor information is acquired from each of the sensor devices 2, based on which a degree of service achievement is calculated; and an actuator control amount (a target control amount) is calculated by a learning device, taking the degree of service achievement as an input value. After each of the actuator devices 3 is controlled using the calculated actuator control amount (target control amount), a degree of service achievement after the control is calculated; and a degree of difference between the degree of service achievement after the control and a targeted degree of service achievement is calculated. This makes it possible to make an appropriate adjustment to the actuator control amount. Thus, devices of wide variety disposed in a physical space can be controlled automatically and appropriately, depending on a purpose of a service and a real-time situation.

DESCRIPTION OF REFERENCE NUMERALS 1 multi device coordination control device
2 sensor device
3 actuator device
10 actuator control amount calculator
12 degree-of-service-achievement calculator
13 actuator controller
100 target control amount calculation part (learning device)
101 degree-of-service-achievement acquisition part
102 learning part
103 actuator control amount output part
110 control amount adjustment part
150 information on correspondence between degree of service achievement and actuator control amount
1000 multi device coordination control system

The invention claimed is:

1. A multi device coordination control device for controlling a plurality of actuator devices disposed in the same physical space, the multi device coordination control device comprising:

a degree-of-service-achievement calculator, including one or more processors, configured to acquire prescribed information on the physical space as sensor information from one or more sensor devices disposed on the same physical space, and convert a value indicated by the acquired sensor information, to a degree of service achievement, the degree of service achievement being an indicator showing to what degree a purpose of a prescribed service realized by controlling the actuator device is achieved;

a target control amount calculation part, including one or more processors, comprising a learning device in which machine learning is performed such that, upon an input of the degree of service achievement, an actuator control amount for each of the actuator devices, designed to satisfy a targeted degree of service achievement which is a target of a degree of service achievement for each service, is computed and outputted, the target control amount calculation part being configured to make the learning device allow an input of the degree of service achievement obtained by the conversion as an input value, and make the learning device compute therefrom an actuator control amount for each of the actuator devices, to thereby obtain the actuator control amount for each of the actuator devices as an output value; and an actuator controller, including one or more processors, configured to convert the actuator control amount obtained as the output value to a control instruction in accordance with each of the actuator devices, and transmit the obtained control instruction to each of the actuator devices, to thereby make the each of the actuator devices execute the control instruction, further comprising a control amount adjustment part configured to adjust an actuator control amount for each of the actuator devices, wherein, after the actuator device executes the control instruction, the degree-of-service-achievement calculator is configured to again acquire sensor information from the one or more sensor devices, and calculate a degree of service achievement after the control of the actuator device is performed, based on a value obtained from the acquired sensor information;

wherein, if the degree of service achievement after the control is smaller than the targeted degree of service achievement, the control amount adjustment part is configured to calculate an adjustment control amount of the actuator device by applying evolution strategy algorithm using a degree of difference, the degree of difference being an indicator showing to what extent the degree of service achievement obtained this time after the control, is different from the targeted degree of service achievement, then calculate an actuator control amount after an adjustment of interest is made, using the calculated adjustment control amount and an actuator adjustment reference amount, the actuator adjustment reference amount being a reference for adjusting an actuator control amount of this time, and, if the degree of service achievement after the control is larger than the degree of service achievement just before the control, update the actuator adjustment reference amount with the actuator control amount of this time; and wherein the actuator controller is configured to convert the actuator control amount after the adjustment, to a control instruction in accordance with each of the actuator devices, and transmits the control instruction thereto, to thereby make each of the actuator devices execute the control instruction.

2. The multi device coordination control device according to claim 1, wherein, if the degree of service achievement after the control is larger than the targeted degree of service achievement, the control amount adjustment part is configured to calculate a cost as a prescribed indicator concerning control of a plurality of the actuator devices after the control, calculate an adjustment control amount of the actuator device by applying evolution strategy algorithm using a degree of difference, the degree of difference being an indicator showing to what extent the degree of service achievement obtained this time after the control, is different from the targeted degree of service achievement, then calculate an actuator control amount after an adjustment of interest is made, using the calculated adjustment control amount and an actuator adjustment reference amount, the actuator adjustment reference amount being a reference for adjusting an actuator control amount of this time, and, if the cost after the control is smaller than the cost just before the control, update the actuator adjustment reference amount with the actuator control amount of this time; and wherein the actuator controller is configured to convert the actuator control amount after the adjustment, to a control instruction in accordance with each of the actuator devices, and transmits the control instruction thereto, to thereby make each of the actuator devices execute the control instruction.

3. A multi device coordination control method performed by a multi device coordination control device that controls a plurality of actuator devices disposed in the same physical space, the multi device coordination control method, comprising the steps of:

acquiring prescribed information on the physical space as sensor information from one or more sensor devices disposed on the same physical space, and converting a value indicated by the acquired sensor information, to a degree of service achievement, the degree of service achievement being an indicator showing to what degree a purpose of a prescribed service realized by controlling the actuator device is achieved;

making a learning device allow an input of the degree of service achievement obtained by the conversion as an input value and making the learning device compute therefrom an actuator control amount for each of the actuator devices, to thereby obtain the actuator control amount for each of the actuator devices as an output value, the learning device being subjected to machine learning such that, upon an input of the degree of service achievement, an actuator control amount for each of the actuator devices, designed to satisfy a targeted degree of service achievement which is a target of a degree of service achievement for each service, is computed and outputted; and converting the actuator control amount obtained as the output value to a control instruction in accordance with each of the actuator devices, and transmitting the obtained control instruction to each of the actuator devices, to thereby make the each of the actuator devices execute the control instruction, wherein, after the control instruction is executed, sensor information is again acquired from the one or more sensor devices, and a degree of service achievement after the control of the actuator device is performed is calculated, based on a value obtained from the acquired sensor information;

wherein, if the degree of service achievement after the control is smaller than the targeted degree of service achievement, an adjustment control amount of the actuator device is calculated by applying evolution strategy algorithm using a degree of difference, the degree of difference being an indicator showing to what extent the degree of service achievement obtained this time after the control, is different from the targeted degree of service achievement, then an actuator control amount after an adjustment of interest is made is calculated, using the calculated adjustment control amount and an actuator adjustment reference amount, the actuator adjustment reference amount being a reference for adjusting an actuator control amount of this time, and, if the degree of service achievement after the control is larger than the degree of service achievement just before the control, the actuator adjustment reference amount with the actuator control amount of this time is updated; and wherein the actuator control amount after the adjustment is converted to a control instruction in accordance with each of the actuator devices, and the control instruction is transmitted thereto, to thereby make each of the actuator devices execute the control instruction.

4. A non-transitory computer readable medium with a multi device coordination control program for causing a computer to serve as the multi device coordination control device according to claim 1.

5. A non-transitory computer readable medium with a multi device coordination control program for causing a computer to serve as the multi device coordination control device according to claim 2.

* * * * *